Nov. 4, 1969  L. W. WELLS  3,476,469
MOTION PICTURE FILM
Filed Feb. 6, 1967  4 Sheets-Sheet 1
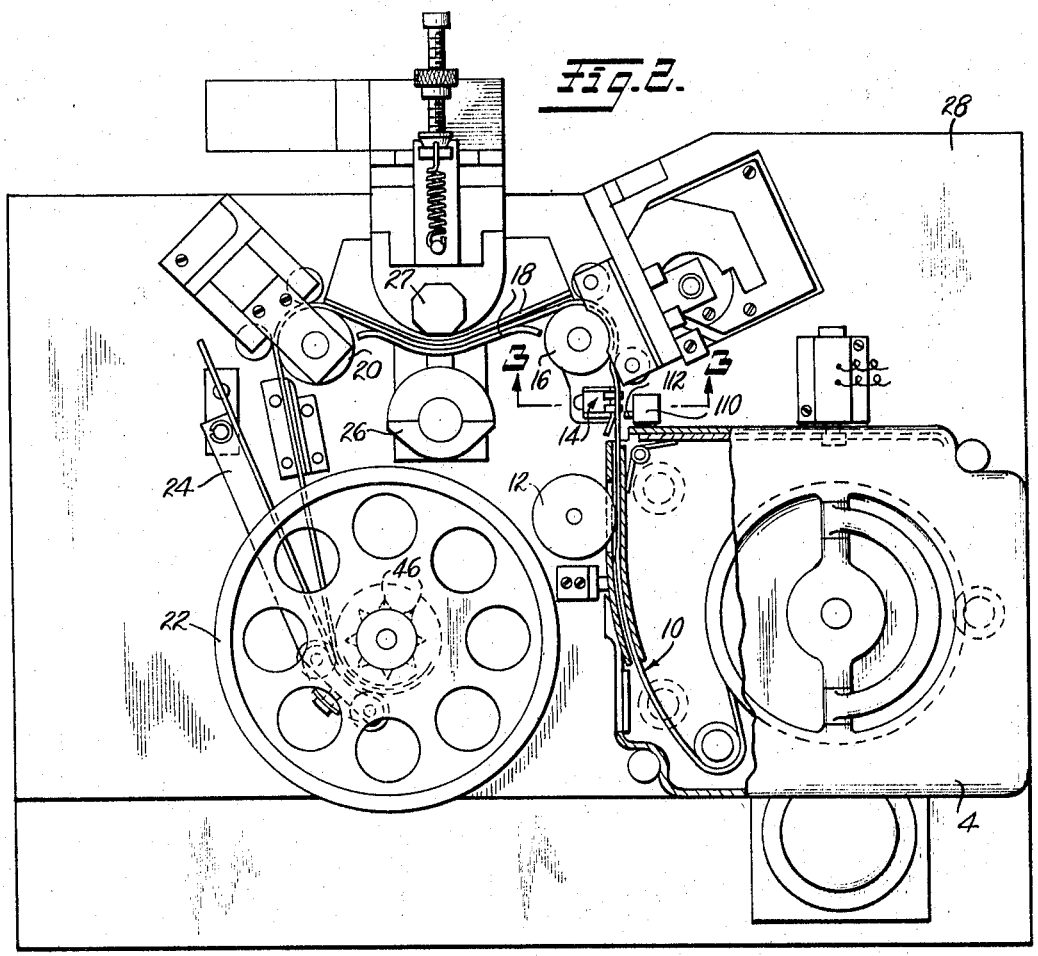
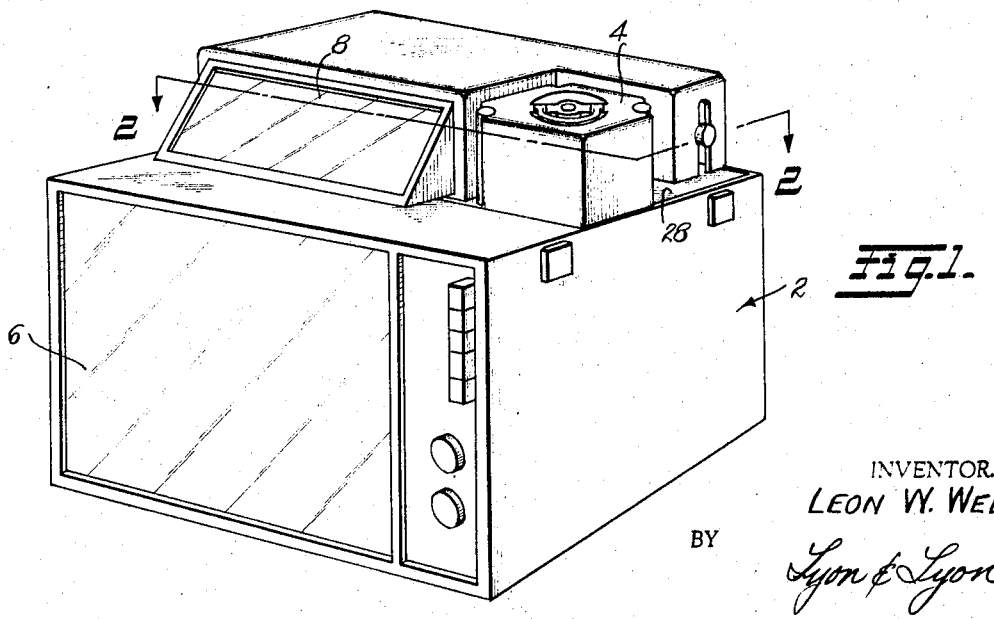
INVENTOR.
LEON W. WELLS
BY
Lyon & Lyon
ATTORNEYS

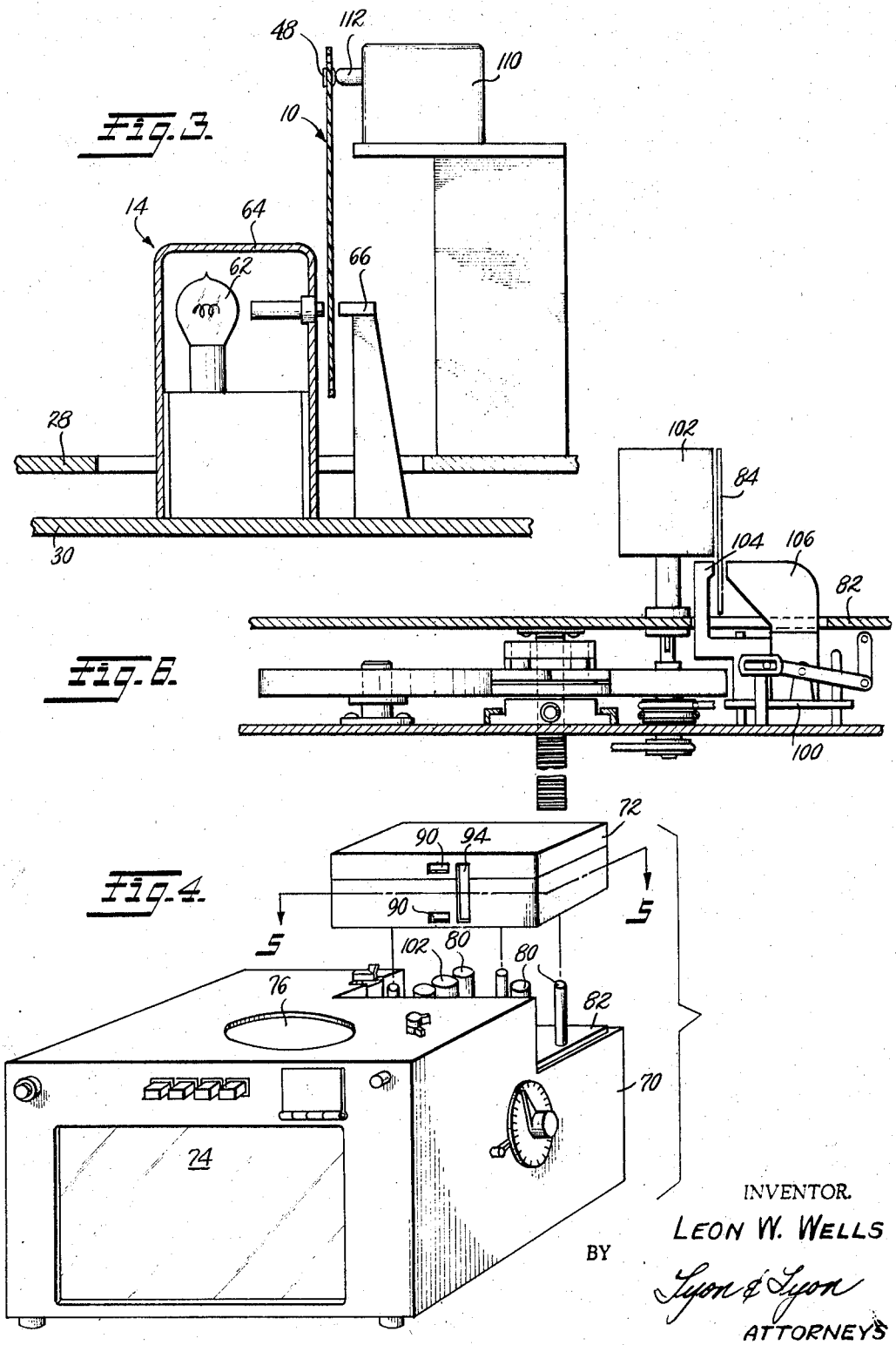

INVENTOR.
LEON W. WELLS
BY
Lyon & Lyon
ATTORNEYS

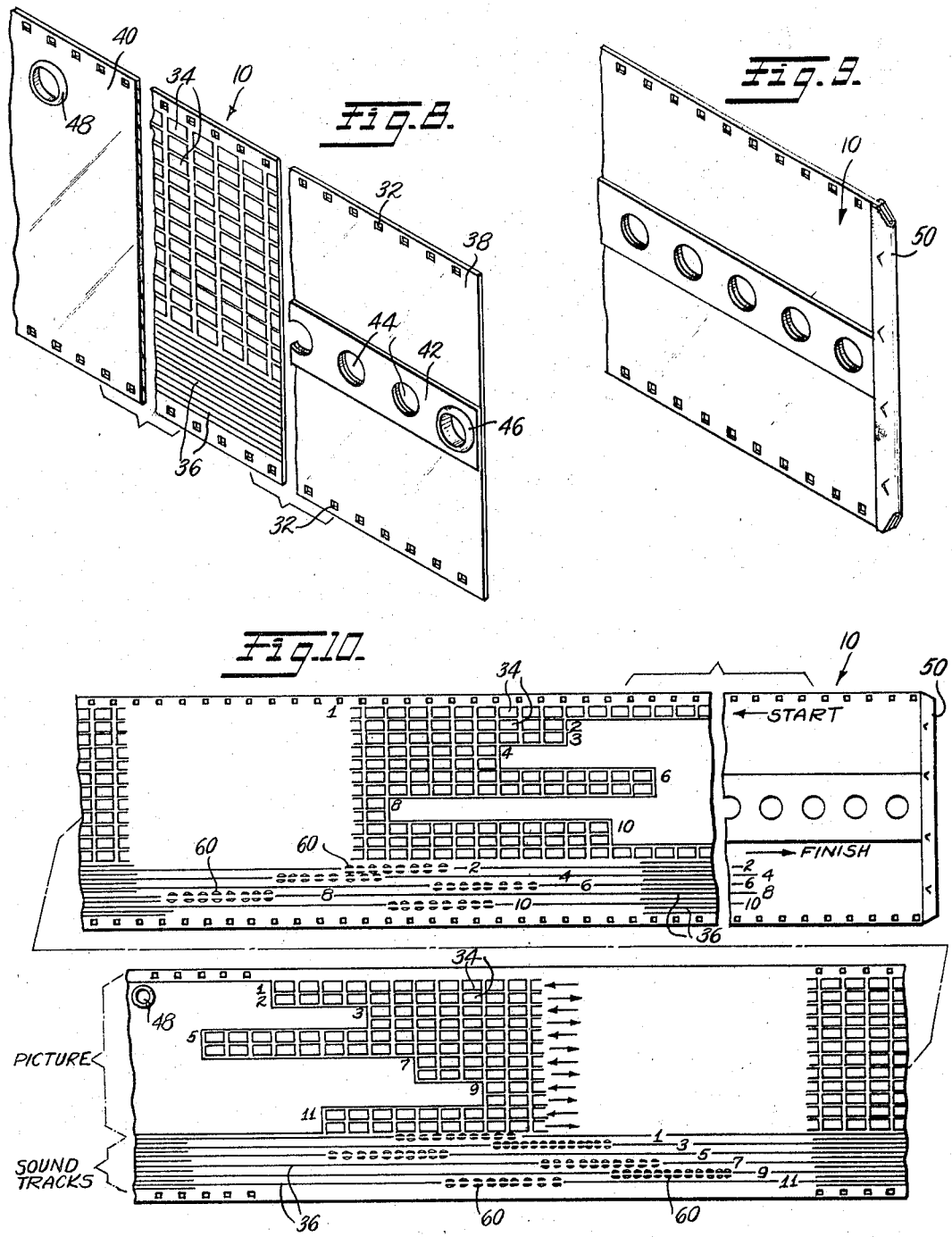

United States Patent Office 3,476,469
Patented Nov. 4, 1969

3,476,469
MOTION PICTURE FILM
Leon W. Wells, Closter, N.J., assignor to Panopix Research Inc., New York, N.Y., a corporation of New York
Continuation-in-part of applications Ser. No. 541,196, Apr. 8, 1966, and Ser. No. 495,370, Aug. 23, 1965. This application Feb. 6, 1967, Ser. No. 619,499
Int. Cl. G03b 31/02
U.S. Cl. 352—37                                   11 Claims

ABSTRACT OF THE DISCLOSURE

A motion picture film having a multiplicity of longitudinal rows of picture frames for successive projection of the rows upon reversal of film travel, and a corresponding multiplicity of sound tracks. Each row of pictures and its corresponding sound track starting at a position along the film corresponding to the terminal end of the preceding row and track, irrespective of the lengths of other adjacent rows and tracks. The film having recorded signal means in fixed relation to the end of the sound tracks to effect reversal of a projection machine and further projector-controlling signal means on the film.

CROSS-REFERENCES TO RELATED APPLICATIONS

This application is a continuation-in-part of my prior application, Ser. No. 541,196, filed Apr. 8, 1966, and of my prior application, Ser. No. 495,370, filed Aug. 23, 1965, now abandoned, which in turn was a division of my application Ser. No. 257,722, filed Feb. 11, 1963 and now Patent No. 3,248,164.

BACKGROUND OF THE INVENTION

The quality of sound reproduced from motion picture film is limited by the speed of film travel. Thus, for smaller film, such as 8 mm., the lineal speed of film travel of conventional film, at 24 frames per second is so relatively low that high frequency sounds cannot be adequately recorded or reproduced. Conventional picture film is also wasteful of raw stock since each frame is accompanied by at least one strip of perforations and wasted material on each side of the perforations. Furthermore, enough film of the conventional type to provide a show of from one-half to 1½ hours duration necessitates a pair of inconveniently large reels.

Some attempts have been made to overcome the above-noted deficiencies by printing more than one row of picture frames on a single film strip. For example, the French patent to Debrie 1,194,241 shows a film having two rows of picture frames and two sound tracks thereon. However, such a film makes possible only a show of very limited duration and involves only one film reversal. Thus, no problems are presented concerning subsequent reversals at a point where the action or sound lends itself to reversal. Other prior art disclosures show a multiplicity of rows of picture frames on the same film but in all those known to applicant, rows are individually selected and each row comprises a complete sequence, there being no contemplation of film reversal to continue projecting more of the same action sequence from subsequent rows. The concept of a multiplicity of rows all depicting a single action sequence or continuing audio-visual sequence presents a number of problems, such as the proper reversal of the film at the end of a scene or at the end of a sentence or word in the corresponding sound track since those events do not always occur at the same longitudinal position along the film in each of the rows.

SUMMARY OF THE INVENTION

By the present invention, applicant has solved the above-noted defects by printing pictures of normally 8 mm. or 16 mm. size on a wide film, such as 70 mm. in width. This film has only two edge rows of perforations and the picture frames are arranged in a multiplicity of longitudinally extending rows. The frames of each row are arranged in side by side relation, rather than one above the other as is the case with conventional film. As is known, each picture frame is a rectangle and the scene depicted thereon is wider than it is high. In conventional film the frames are placed one above the other. Therefore, any sound optically recorded on the film and related to that particular frame is allowed a linear drive of only the height of a picture frame and the speed of the film is thus so reduced that high frequency sound cannot be adequately recorded for reproduced.

According to the present invention the picture frames are arranged in longitudinal rows in side by side relation wherein the width of the scene extends along the length of the film. Thus, movement of film for each frame is considerably increased and a greater range of audio frequencies is possible. In addition, by arranging the rows one below the other is relatively close proximity, a longer show can be recorded on a relatively short length of film (as many as 14 rows can be placed on 70 mm. film), thus permitting the use of small reels occupying only a relatively small space and rendering it practical to distribute the film for a complete show in a single cartridge.

The direction of the action of the audio-visual sequence in the upper row of frames and its corresponding sound track, for instance, may extend from right to left and the action sequence of successive frames of the next lower row extend from left to right and so on. Thus, in projecting the film, it is first run in one direction to project one row of frames, then the film is stepped laterally to align the next row of frames with the projector and the film is then run in the opposite direction to project the second row, and so on. Sound can also be recorded on such film in a plurality of rows along the one edge of the film strip and a separate sound detector or reader sequentially scans successive sound tracks each time the film is moved laterally. By such an arrangement, applicant is able to record shows exceeding one-half hour in length on wide film of about 2¾ inch width and on a reel or roll having outer diameter of the order of 1½ inches. Obviously, the cost of processing a show on applicant's film is less than for conventional film since the cost of developing and printing 70 mm. film is about the same as the cost of developing and printing an equal length of 8 mm. film. This invention contemplates mounting such film in a cartridge. The novel film of the present invention not only includes the features outlined above but further provides novel signal means on the film itself to effect reversal at the end of each row. Such signal means preferably comprise a low-frequency, optically recorded signal at the end of each sound track whereby the sound pickup system can effect reproduction of recorded sound and then when the appropriate signal is received from the film it effects reversal of the film and lateral stepping thereof to continue projection of the next row. Since it is contemplated that the film be mounted in a cartridge, it is further provided with additional safety signal means to ensure that the machine will not continue to run and pull all film from the cartridge even in the event of failure of the sound pickup or signal detecting apparatus. In addition, the film is provided with structure at its outer end adapted to cooperate with means on the cartridge to effect stopping of the projection machine after reproduction of the last row of picture frames.

BRIEF DESCRIPTION OF THE DRAWINGS

FIG. 1 is a schematic perspective view of one form of projection apparatus adapted for projecting the film of this invention;

FIG. 2 is a schematic top plan view of portions of the apparatus of FIG. 1, substantially as seen along the line 2—2 of FIG. 1 with portions broken away;

FIG. 3 is a schematic sectional view on the line 3—3 of FIG. 2;

FIG. 4 is a schematic perspective view of a different embodiment of projector adapted to project film of this invention;

FIG. 6 is a schematic sectional view along the line 6—6 of FIG. 5;

FIGS. 8 and 9 are enlarged perspective views of portions of film each of which is adapted for use with the apparatus of FIGS. 1 to 3; and FIG. 10 is a fragmentary face view of a novel film embodying the present invention.

DESCRIPTION OF THE PREFERRED EMBODIMENT

Figure 5:
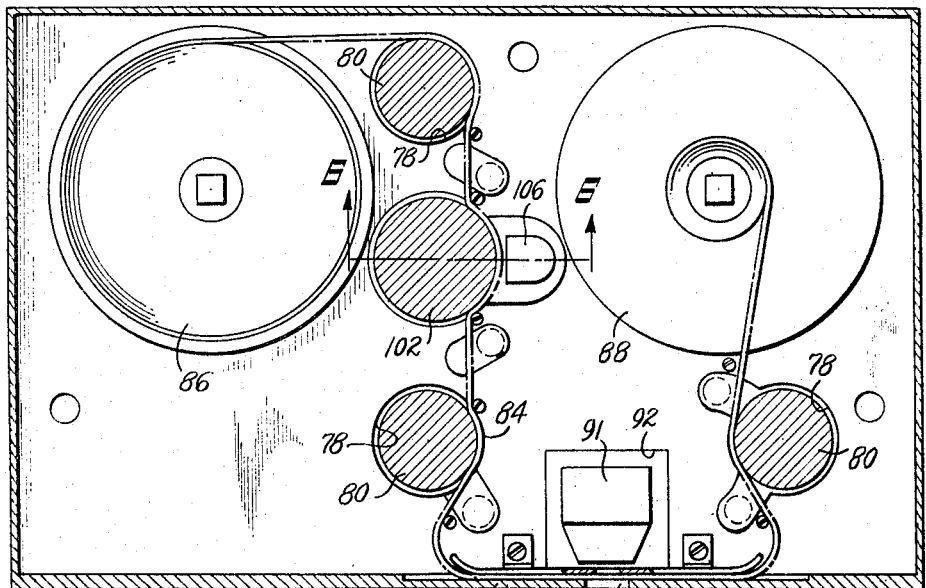
FIG. 5 is an enlarged sectional view through the cartridge of FIG. 4 as seen on the line 5—5 thereof.

FIGS. 1 and 2 illustrate features of the projection machine more fully and completely described in my copending application Ser. No. 541,196 and reference is made thereto for a complete description of the machine. Some of the features, however, will be described herein for a complete understanding of the present invention.

The projection apparatus 2 is arranged to receive a cartridge 4 having a supply of film on a reel therein. When the machine is put into operation, film is automatically withdrawn from the cartridge 4 and threaded through the projection apparatus and the pictures are projected, by internal optical means, onto the rear face of translucent screen 6. Numeral 8 indicates the speaker from which the recorded and reproduced sound emanates.

Referring now to FIG. 2, the cartridge 4 is provided with a supply of film 10 which, when the machine is started, is automatically withdrawn from the cartridge by friction wheel 12 and the leading end of the film is pushed along a path adjacent a signal sensing means 14, thence around a driving capstan 16, then along a projection zone between guide plates 18, then around timing sprocket 20 to a takeup reel 22. The leading edge of the film is guided from the timing sprocket 20 to the takeup reel 22 by a spring-pressed, pivoted arm 24. In the projection zone the film passes between a light source 26 and a rotary prism 27 drivingly connected to sprocket 20, there being gates or apertures in the guide plates 18. Thus, the film moves continuously through the projection zone and successive images are projected onto the screen 6 in the manner described in the aforementioned copending application. After the leader portion of the film has fully engaged the takeup reel, the film continues to move in the forward direction to project the upper or first row of picture frames. When the last frame of the first row reaches the projection zone, the corresponding sound track reaches sound reproducing means (not shown in FIG. 2 but described in the copending application) and at about the same time a signal optically recorded on the film passes the detector 14. The detector 14 is described in Ser. No. 541,196 as being positioned on the vertically movable platform 28 which carries the mechanism shown in FIG. 2. As shown in FIG. 2, however, the detecting device 14 is carried by a separate platform 30 (see FIG. 3), which is the same platform that carries the sound detecting means. At the end of each sound track (except the last one) an optical signal is recorded on the film and to which the detector 14 responds. The output of the detector effects reversal of the drive mechanism so that the film is then caused to reverse its direction of travel and at the same time the platform 28 is caused to move upwardly through a distance equal to the width of one row of picture frames to thus align the next row of picture frames with the optical projection system. Upward movement of the platform 28 causes the platform 30 to move upwardly through a shorter distance, since the sound tracks are narrower than the rows of picture frames and are closer together. Thus, the sound pickup means and the detector 14 are always aligned with the sound track corresponding to the row of picture frames being projected. There is no reversing signal at the end of the last sound track. During reproduction of the last sound track the film is moving toward the cartridge 4, so when the end of the track is reached, the film continues to run until it is all returned to the cartridge and other means on the film then stop the machine.

Referring now to FIG. 8, the film 10 shown thereon is provided with the usual edge perforations 32 for engagement with the timing sprocket 20. The rows of picture frames 34 and the sound tracks 36 are printed on an intermediate portion of the film, leaving fairly long leader portions 38 and 40 at each end thereof. The leader portion 38 is provided at its end with a reinforcement, such as Mylar tape 42 provided with a series of openings 44 therein. The openings 44 are guided by the pivoted arm 24 previously described onto the projections 46 of takeup reel 22 to ensure positive engagement therewith. The eyelet 46 in the outermost opening 44 is for the purpose of preventing complete withdrawal of the leading end of the film into the cartridge 4 at the end of a projection cycle. These features, however, are all described in Ser. No. 541,196. The leader portion of the film, at the inner end thereof is provided with a further eyelet 48 that will be described in more detail later.

An alternative form of leading end for the film is shown in FIG. 9. The film is considered to be otherwise identical to that shown in FIG. 8 except that the eyelet 46 is omitted and a channel-shaped metal clip 50 is affixed to the end of the film 10 and extends completely thereacross one edge to the other. This strip remains on the film and cooperates with a novel cartridge structure to effect shutting off of the projection machine but which novel cartridge forms no part of the present invention. However, the film of FIG. 9 may be advantageously used with the projection machine shown in FIGS. 1 and 2. As previously indicated, the film 19 is of considerable width and during the automatic threading of the film in the projection machine, the leading end thereof is at times unsupported. Since films of such width often tend to buckle or curl laterally, such curling or buckling could cause the end of the film to engage adjacent portions of the mechanism during threading and could result in tearing the end or damage thereto in addition to preventing proper and efficient threading. The bar or clip 50, however, ensures that the leading end of the film 10 will be straight and upright at all times and thus the guiding and receiving means of the transport mechanism can be accurately designed and the film will then always and reliably follow a predetermined course in the manner intended. This is, of course, a novel feature of the film itself.

Referring now to FIG. 10, which shows the novel features of the present film, adaptable for use with either the apparatus of FIGS. 1 and 2 or the apparatus of FIGS. 4 to 6, the film is shown as having thereon twelve rows of picture frames 34 and twelve sound tracks 36. The arrows indicate the direction of action sequence in the respective rows of frames. For a system of the type contemplated here it is essential that the change-over from one row of frames to the next and from one sound track to the other be at a point in the action and sound sequence that will be the least disturbing to the viewer. For this reason it is important that the change-over be made at an appropriate pause in the visual action and at a time when there is at least momentary silence in the sound track, that is at the end of a sentence, phrase or word. In other words, the change-over takes place during a period of "silence" in the audio-visual sequence. It is inconceivable that all rows of picture frames and sound tracks would reach such a place, all at the same longitudinal position on the film. Thus, as shown in FIG. 10, row No. 1, which is the first row projected, may be started at any desired place on the film after the leader has been engaged with the takeup reel. However, an appropriate termination point for row No. 1 may be selected to also be at any desired position along the length of the film, as shown in the lower portion of FIG. 10. It is absolutely essential that the commencement of row No. 2 be at the same longitudinal position as the termination of row No. 1 so that the action will pick up without observable interruption upon upward movement of the platform 28 and reversal of the direction of film drive. Thus the terminal end of row No. 1 and starting end of row No. 2 must be in lateral alignment. As shown in the top portion of FIG. 10, an appropriate terminating point for row No. 2 does not occur at the start of row No. 1 but is selected to fall short thereof and the starting end of row No. 3 is again shown as being in lateral alignment with the terminal end of row No. 2. It will be obvious from an inspection of FIG. 10 that this relationship is maintained for all successive rows of picture frames and as will almost invariably occur, each adjacent pair of rows of picture frames are laterally aligned at one end at a longitudinal position along the film displaced from the corresponding ends of adjacent pairs of rows. Since the sound tracks 36 must correspond in length to their corresponding rows of picture frames 34, they too will start and terminate at different longitudinal positions along the film. At the terminal or concluding end of each sound track, except the last, there is optically recorded a signal 60 which, for purpose of example, may be a 40 c.p.s. signal.

In printing the sound tracks on the film no audio frequencies lower than about 100 c.p.s. are recorded and the signals 60 may be any desired or appropriate frequency below that value and frequencies in the range of 20 to 60 c.p.s. are contemplated. Referring again to FIG. 2 and also to FIG. 3, the detector device 14 comprises a light source 62 in a suitable casing 64 and a light-responsive element 66 on the opposite side of the film 10. The detecting means 14 is designed to respond to the signals 60 to effect reversal of the film and stepping of the platforms 28 and 30. It is to be remembered that the detector 14 is at all times aligned with the sound track corresponding to the row of picture frames being projected. Thus, the signals 60 at the terminal ends of alternate sound tracks will be spaced beyond the end of the recorded sound and those signals at the terminal ends of intermediate sound tracks will be superimposed on the sound track itself. This is true because the detecting means 14 is shown as displaced longitudinally along the film 10 from the sound detector (not shown herein) but which is located directly below the capstan drum 16. However, even though some of the signals 60 are superimposed directly over the recorded sound, these signals are not reproduced in the sound system because the sound pickup device is designed to respond only to frequencies above about 100 c.p.s. It is contemplated, however, that the detector means 14 be completely eliminated and the sound detector means 14 be completely eliminated and the sound detector itself serve both to reproduce recorded sound to accompany the pictures and also to respond to the signals 60 which will then always occur at the terminal end of each sound track except the last.

Such a detector system will be obvious to those skilled in the art since the detector will always generate an electrical signal in response to whatever is recorded on the sound track. The sound reproducing circuits can be designed to reject all frequencies below about 100 c.p.s. and any frequencies in the range of 20 to 60 c.p.s. could be caused to direct a signal in a different circuit and directed to relays or the like to effect film reversal and platform stepping.

Referring briefly now to FIGS. 4 through 7, the apparatus shown therein is as shown and described in my application Ser. No. 257,122 and now Patent No. 3,248,-164 and in Ser. No. 495,370. In that apparatus a vertically movable platform 82 of the projection machine 74 receives a cartridge 72 and projects visual images recorded on a film onto screen 74, and the recorded sound is reproduced by speaker 76. The structural features of this machine will not be described in detail except to point out that the film in cartridge 72 is at all times completely contained therein. The cartridge is provided with openings in its lower wall, shown at 78 in FIG. 5, through which the various guiding and driving rollers 80 on the movable platform 82 can be projected to engage a film 84 wound on a supply reel 86 and on a takeup reel 88 journalled in the cartridge 72. When the cartridge is in position, an intermittent film drive mechanism operates through the openings 90 to advance the film in a step-by-step manner and optical means 91 extending into the cartridge through an opening 92 provides a light source on one side of that portion of the film 10 adjacent aperture 94 to project the images recorded on that film.

Figure 7:
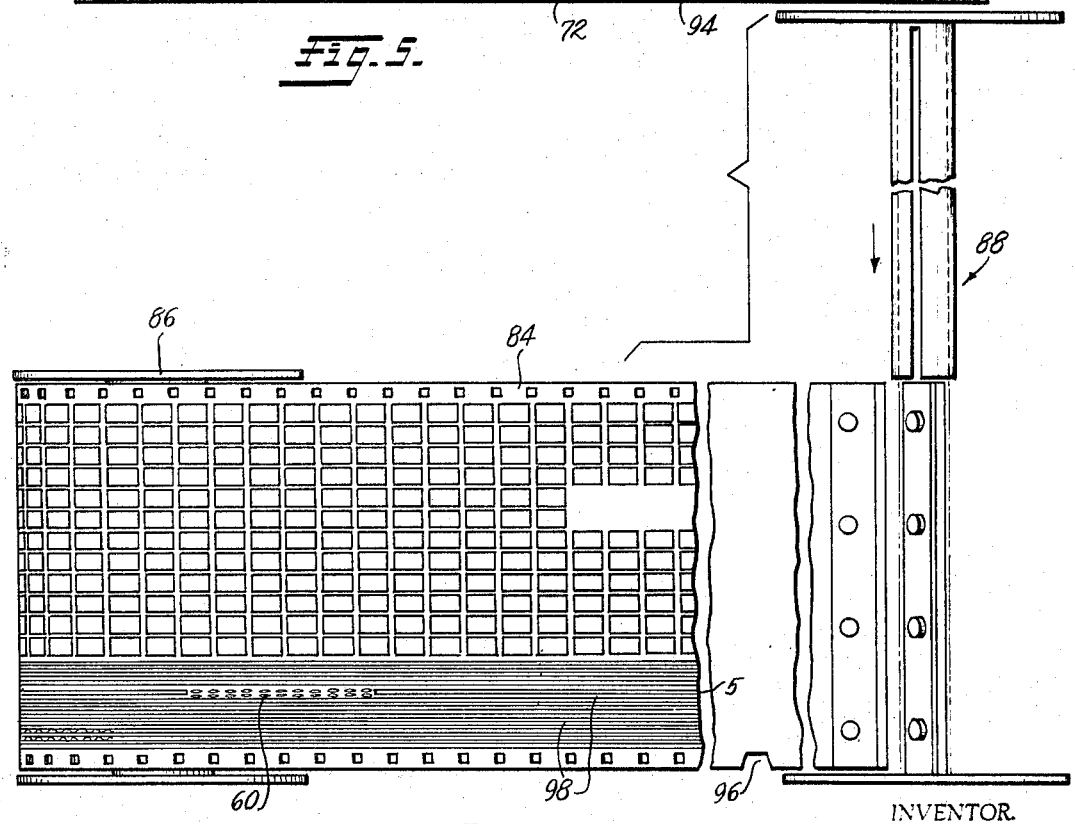
FIG. 7 is an enlarged view of a takeup reel and a portion of the film in the cartridge of FIG. 5.

FIG. 7 merely shows the film employed with this form of the invention, as modified in accordance with the present invention, and illustrates some of the details of the takeup reel 88. In that form of the invention there was described a notch or the like 96 at each end of the portion of the film bearing the recorded information, which notch would cooperate with a suitable switch to effect reversal of the film and vertical stepping of the platform 82 at the same longitudinal position along the film. However, it will be obvious that this is not a suitably satisfactory system for the reasons already pointed out and it is contemplated that reversal be effected by the low-frequency signal means 60 provided at appropriate places along the sound tracks 94 and thus permit the unrestricted selection of appropriate positions along the film for termination of any row of picture frames and commencement of the next row. However, the notch 96 may be employed also in the present invention for another purpose, which will be described later.

FIG. 6 is a schematic showing of a portion of the disclosure from application Ser. No. 495,370 and illustrates the relationship and connection between the platform 82 and a sub-platform 100 upon which the sound detecting mechanism is mounted. In this figure, 102 is a driven capstan drum engaging the film 84, which latter projects downwardly below the lower edge of the drum 102 so that the sound track portion of the film is below the drum. The sound detecting means comprises portions 104 and 106 on platform 100 and, respectively, on opposite sides of the film 84 and which detect and effect reproduction of the recorded sound. As shown in this figure, the sound detecting means is directly below the capstan drum 102 to ensure that it respond to a portion of the film being driven at accurately uniform speed. Clearly, the circuitry responsive to the sound detecting means shown can be made to discriminate between audio information and the low-frequency signals 60. No attempt will be made heren to describe the mechanism for stepping the platforms or reversing the film drives since such constitute no part of the present invention.

Referring again to FIGS. 8 and 10, there is shown therein a further eyelet 48 on that portion of the film 10 between the inner ends of all of the rows of picture frames and sound tracks and the innermost end of film 10. Preferably, however, the eyelet 48 will be closely adjacent the inner end of the longest row of picture frames. It is contemplated that the projection apparatus be modified to include a further switch, such as the microswitch 110, shown in FIGS. 2 and 3. The microswitch 110 is supported by platform 28 in such position that its actuator lever or button 112 will be in the path of movement of the eyelet 48.

In the event the sound detecting means or the sensor 14 of FIG. 2 become inoperative for some reason, such as failure of the light source, the microswitch 110 will function as a safety device to prevent damage to the film or apparatus. Clearly, if the apparatus should fail to function to reverse the direction of film drive at a time when it reaches the end of a row next the outer end of the film, no damage will be done because the film will then merely continue in the same direction and will be withdrawn into the cartridge as though the entire cycle had been completed. However, if there should be such a failure at a time when the film is being withdrawn from the cartridge, failure to reverse the direction of film drive would result in continued withdrawal until all the film is completely withdrawn from the cartridge and possibly torn from its anchorage on the reel therein. The eyelet 48 and microswitch 110, which would effect reversal of film drive so that the film is then drawn into the cartridge and unthreaded from the machine and after which the machine will be stopped by mechanism previously referred to and as actuated by the clip 50 at the outer end of the film. Obviously, instead of the eyelet 48 or the eyelet 46 or strip 50, the film could be provided with other appropriate physical discontinuities capable of performing the functions attributed to those elements. For example, instead of eyelet 48 any appropriate type of projection from the film could be provided or the film might be provided at the corresponding position with a notch, such as the notch 96 shown in FIG. 7.

While a single basic embodiment of the novel film has been shown and described herein, it is apparent that other modifications may be resorted to within the scope of the appended claims.

I claim:

1. A motion picture sound film comprising at least one continuing audio-visual sequence recorded thereon, a multiplicity of picture frame rows and sound tracks extending longitudinally of the film with each picture frame row comprising sequential rectangular picture frames in side-by-side relation with their long dimensions extending longitudinally of said film and having a corresponding related sound track extending in the same direction, said continuing audio-visual sequence comprised of at least three said picture frame rows and related sound tracks progressing through successive frames in one longitudinal direction in one row and related track and then in the reverse longitudinal direction in the next row and related track serially through the entire said continuing sequence, each row and related track having a beginning end and a concluding end in relation to the progression of said continuing sequence with the concluding end of one row and related track longitudinally aligned with and laterally spaced from the beginning end of the next following row and related track in said continuing sequence, and each said concluding end within the progression of said continuing sequence located at a normally substantially silent point in the audio sequence recorded on the said sound track.

2. A motion picture film as defined in claim 1 wherein the concluding ends of certain of said picture frame rows and corresponding sound tracks are longitudinally spaced from the adjacent end of an adjacent row.

3. A motion picture film as defined in claim 1 including optically recorded signal means in predetermined relation to the concluding end of certain of said sound tracks for effecting reversal of said film.

4. A motion picture film as defined in claim 3 wherein the sound recorded on said sound tracks contains only frequencies higher than a predetermined minimum frequency; said signal means being superimposed on said sound tracks, at the concluding ends thereof, and comprising a frequency substantially lower than said predetermined minimum frequency.

5. A motion picture film as defined in claim 3 including a structural discontinuity on said film, following the concluding end of certain of said sound tracks, for effecting reversal of said film in the event of failure of means responsive to said optically recorded signals.

6. A motion picture film as defined in claim 1 including stop means projecting from at least one surface of said film, at one end thereof for actuating means for terminating operation of a projection apparatus.

7. A motion picture film as defined in claim 6 wherein said stop means comprises a substantially rigid member secured to one end of said film and extending substantially from edge to edge thereof to further function to prevent lateral buckling of said end of said film.

8. A motion picture film device including a reel; a length of film having its inner end wound on said reel and its outer extending therefrom; a multiplicity of picture frame rows and sound tracks extending longitudinally of the film with each picture frame row comprising sequential rectangular picture frames in side-by-side relation with their long dimensions extending longitudinally of said film and having a corresponding related sound track extending in the same direction, said continuing audio-visual sequence comprised of at least three said picture frame rows and related sound tracks progressing through successive frames in one longitudinal direction in one row and related track and then in the reverse longitudinal direction in the next row and related track serially through the entire said continuing sequence, each row and related sound track having a beginning end and a concluding end in relation to the progression of said continuing sequence with the concluding end of one row and related track longitudinally aligned with and laterally spaced from the beginning end of the next following row and related track in said continuing sequence; the beginning and concluding ends of all said picture frame rows and sound tracks being longitudinally spaced from the corresponding ends of said film; optically recorded signal means on said film adjacent the concluding ends of certain of said sound tracks; a structural discontinuity on said film between and spaced from the inner end of said film and the adjacent ends of said picture frame rows and sound tracks; and means projecting from at least one surface of said film at the outer end thereof.

9. A motion picture film as defined in claim 1, wherein said picture frame rows are positioned adjacent each other and located within one area of said film and said sound track are positioned adjacent each other and located in another area of said film.

10. A motion picture film as defined in claim 1, wherein said picture frame row and said sound tracks are located on one portion of said film, a leader portion extends from said one portion to a leading end of said film, said leader portion at said leading end having a longitudinal row of relatively closely spaced openings therein, generally centrally of the edges of said film and extending to said leading end whereby said perforations may be engaged by means on a take-up reel in a self-threading projection machine to initiate winding said film on said reel.

11. A motion picture film as defined in claim 10, wherein a strip of reinforcing material is secured to one face of said leader portion at said leading end, and said openings extend through both said leader portion and said strip of reinforcing material.

References Cited

UNITED STATES PATENTS

| | | |
|---|---|---|
| 2,007,214 | 7/1935 | Proctor. |
| 2,168,041 | 8/1939 | O'Grady. |
| 2,322,489 | 6/1943 | Von Madaler _____ 352—6 |
| 2,483,040 | 9/1949 | El-Mazzaoui. |
| 2,542,188 | 2/1951 | Gates _____ 352—7 |
| 3,022,165 | 2/1962 | Solow et al. |
| 3,115,806 | 12/1963 | Beyer et al. |

FOREIGN PATENTS 9,262   1909   Great Britain

OTHER REFERENCES

D. C. Allais, Combination Rim Drive and Leader Flexing Roller, IBM Technical Disclosure Bulletin, vol. 9, No. 7, December 1966.

JULIA E. COINER, Primary Examiner

U.S. Cl. X.R.

352—83, 232, 235